(12) United States Patent
Larsson et al.

(10) Patent No.: US 7,726,698 B2
(45) Date of Patent: Jun. 1, 2010

(54) MANIFOLD COMPRISING A BODY WITH A CONICAL INNER SURFACE SUCH THAT THE CROSS-SECTIONAL AREA DECREASES IN THE DIRECTION OF FLOW

(75) Inventors: Thomas Larsson, Valskog (SE); Jarmo Smahl, Nastola (FI); Peter J. Hauki, Virsbo (SE)

(73) Assignee: Uponor Innovation AB, Virsbo (SE)

( * ) Notice: Subject to any disclaimer, the term of this patent is extended or adjusted under 35 U.S.C. 154(b) by 903 days.

(21) Appl. No.: 10/547,952

(22) PCT Filed: Mar. 2, 2004

(86) PCT No.: PCT/FI2004/000112

§ 371 (c)(1),
(2), (4) Date: Oct. 11, 2006

(87) PCT Pub. No.: WO2004/079250

PCT Pub. Date: Sep. 16, 2004

(65) Prior Publication Data

US 2007/0062592 A1 Mar. 22, 2007

(30) Foreign Application Priority Data

Mar. 3, 2003 (FI) .................................. 20030329

(51) Int. Cl.
*F16L 41/00* (2006.01)
(52) U.S. Cl. .................................. 285/125.1; 285/129.1
(58) Field of Classification Search .............. 285/125.1, 285/129.1, 131.1, 129.2
See application file for complete search history.

(56) References Cited

U.S. PATENT DOCUMENTS

| | | | | | |
|---|---|---|---|---|---|
| 884,326 | A | * | 4/1908 | Emery ...................... | 285/125.1 |
| 1,271,779 | A | * | 7/1918 | Schroeder et al. ......... | 285/125.1 |
| 1,801,091 | A | * | 4/1931 | Krauss .................... | 285/131.1 |
| 2,262,627 | A | * | 11/1941 | Whitesell, Jr. et al. ... | 285/125.1 |
| 2,608,819 | A | * | 9/1952 | Moorehead et al. ...... | 285/125.1 |
| 3,103,942 | A | | 9/1963 | Sharp | |
| 3,794,056 | A | | 2/1974 | Warren | |
| 4,609,009 | A | | 9/1986 | Tisone | |
| 4,690,174 | A | | 9/1987 | Jarvenkyla | |
| 4,971,307 | A | * | 11/1990 | Killerud et al. .......... | 285/131.1 |
| 7,168,448 | B2 | * | 1/2007 | Schmidt ................. | 137/561 A |
| 2004/0168727 | A1 | | 9/2004 | Smahl et al. | |

FOREIGN PATENT DOCUMENTS

| | | |
|---|---|---|
| BE | 790869 | 3/1973 |
| FR | 1107453 | 1/1956 |
| JP | 2001182886 A | 7/2001 |
| JP | 2004116601 | 4/2004 |
| WO | WO 03/004924 A1 | 1/2003 |

* cited by examiner

*Primary Examiner*—David E Bochna
(74) *Attorney, Agent, or Firm*—Occhiuti Tohlicek & Tsao LLP

(57) ABSTRACT

A manifold (1) comprises a body (2) with a plurality of branch fittings (3) diverging therefrom. The inner surface of the body (2) is conical such that the inner cross-sectional area of the body (2) decreases in the direction of flow. The manifold (1) is particularly well suited for use in tap water systems. The manifold (1) can be manufactured e.g. from polyphenyl sulfone PPSU, polysulphone PSU, polyvinylidene fluoride PVDF, glass fiber reinforced polyamide PA, or cross-linked polyolefin plastic.

14 Claims, 3 Drawing Sheets

MANIFOLD COMPRISING A BODY WITH A CONICAL INNER SURFACE SUCH THAT THE CROSS-SECTIONAL AREA DECREASES IN THE DIRECTION OF FLOW

BACKGROUND OF THE INVENTION

The invention relates to a manifold comprising a body with a plurality of branch fittings diverging therefrom.

A manifold is used in pipeworks at points where liquid flowing in a pipework is conveyed from a main pipe to branch pipes. A manifold comprises a body including several branch fittings. Liquid is conveyed to the manifold along a main pipe while the branch fittings are provided with branch pipes, the manifold thus enabling the liquid to be divided from the main pipe into the several branch pipes. Typically, a manifold is used e.g. in tap water systems and heating systems, such as in floor heating systems.

Application Fl 20 012 460 discloses a bypass manifold manufactured e.g. from plastic. A connecting piece can be arranged in the branch fittings of the bypass manifold, which comprises a means for locking the connecting pieces in place, the locking means comprising one or more parts. Furthermore, the publication discloses a bypass manifold whose structure forms a modular system, enabling the body of the bypass manifold to be provided with different connecting pieces and the connecting pieces to be locked in place tightly and reliably. Such a bypass manifold is extremely versatile, enabling e.g. branch pipes of different sizes and even of different materials to be connected to the same bypass manifold by means of a connecting piece.

BRIEF DESCRIPTION OF THE INVENTION

An object of the present invention is to provide a novel and improved manifold.

The manifold of the invention is characterized in that the inner surface of the body is conical such that the inner cross-sectional area of the body decreases in the direction of flow.

The idea underlying the invention is that in the case of a manifold with a body comprising a plurality of branch fittings diverging therefrom, the inner surface of the body is conical such that the inner cross-sectional area of the body decreases in the direction of flow. This makes the flow characteristics of the manifold extremely good since the conical shape enables flows to be divided in an advantageous manner. Furthermore, such a manifold is quite simple and easy to manufacture e.g. from plastic by die-casting since a tool used in the die-casting can be very easily withdrawn from inside the conical body. The idea underlying an embodiment is that a wall of the body of the manifold is substantially equally thick throughout, which means that the outer surface of the body of the manifold is also substantially conical. The amount of material to be used for the manifold is then reduced considerably, thus enabling material savings to be achieved while manufacturing the manifold. Furthermore, while manufacturing a manifold by die-casting, the manifold is thoroughly and uniformly cooled down, which means that no additional stress appears inside the material. The idea underlying a second embodiment is that the convergent angle of the outer surface of the body of the manifold is larger than the convergent angle of the inner surface. The wall of the manifold is then thinner at the rear end of the manifold than at the front end thereof. In such a case in particular it is possible to save in the amount of material. The strength of the manifold can still be kept sufficient. An embodiment is that the ratio of the outer diameter of the body of the manifold to the thickness of the wall is constant all the time. The thickness of the wall is thus at its thinnest when the outer diameter is at its smallest. The idea underlying yet another embodiment is that the inner diameter of the body of the manifold at the rear end of the manifold is arranged to be equal in size to the inner diameter of the last branch fitting. This enables the amount of material necessary for the structure of the manifold and the flow of liquid inside the manifold to be optimized.

BRIEF DESCRIPTION OF THE DRAWINGS

The invention will be described in closer detail in the accompanying drawing, in which.

DETAILED DESCRIPTION OF THE INVENTION

Figure 1:
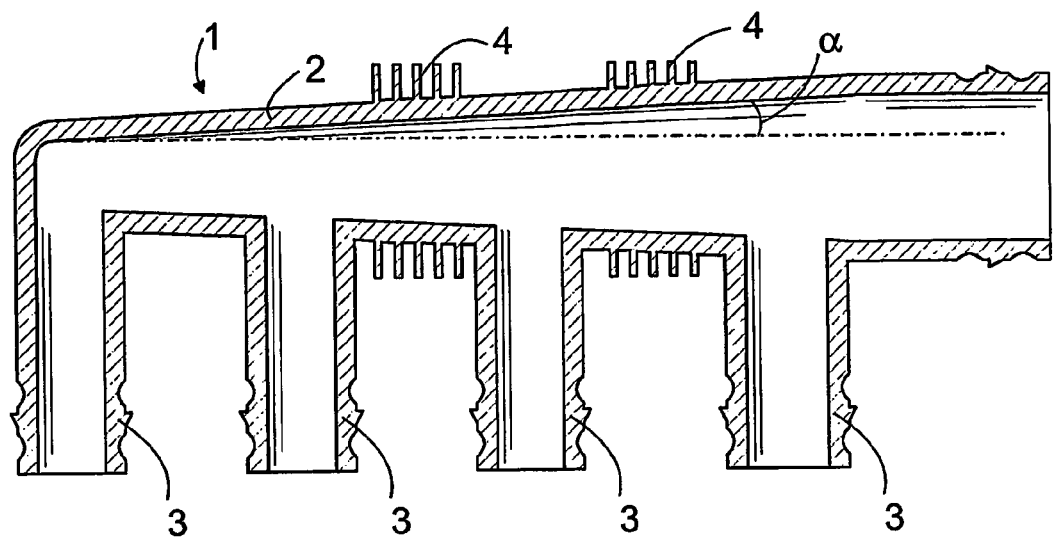
FIG. 1 is a schematic, cross-sectional side view showing a manifold.

FIG. 1 shows a manifold 1. The manifold 1 comprises a body 2 and a plurality of branch fittings 3 arranged to diverge from the body 2. The number of branch fittings 3 may vary as necessary. Typically, at least three branch fittings 3 are provided. The number of branch fittings 3 may vary e.g. between three and five. The diameters of the branch fittings 3 may be equal in size or a branch fitting or some branch fittings may have larger diameters than the others. The branch fittings 3 may be located at regular distances from each other or the distance between the branch fittings 3 may vary. In the manifold 1 shown in FIG. 1, the first branch fitting 3 in the direction of flow of liquid has the largest outer and inner diameter. The distance between the first and the second branch fitting is also larger than the distance between the other branch fittings; this is to provide enough room for installation around the branch fitting 3 with the largest diameter.

In the case shown by FIG. 1, a main pipe is arranged in the manifold 1 in a right-hand fitting of the manifold 1. In the case of FIG. 1, the manifold 1 is closed at its one end, i.e. only one main pipe and branch pipes are connected to the manifold 1. No ongoing main pipe is thus connected to the particular manifold. The manifold 1 has thus, while being manufactured, already been provided with a closed end, so it does not have to be plugged at the end. The closing end of the body 2 of the manifold can then be curved at its top corner, which is advantageous for the flow of liquid. The branch pipes to be connected to the manifold 1 are thus such that the diameter of one branch pipe is larger than the diameter of the other three branch pipes to be connected to the manifold 1. If no branch pipe is to be connected to the branch fitting 3, it can be plugged.

Liquid is arranged to flow from the main pipe to the branch pipes. As seen in the direction of flow of liquid, the inner surface of the manifold 1 is conically convergent. Consequently, at the end where the main pipe is to be connected, the inner diameter of the manifold 1 is larger than at the opposite end. The manifold 1 converges such that the coning angle α of the inner surface of the body 2 is e.g. at least 2°. The coning angle α may vary e.g. between 2° and 10°. Preferably, the coning angle varies between 3° and 8°. A preferred embodiment is that the coning angle α is 5°.

Figure 4:
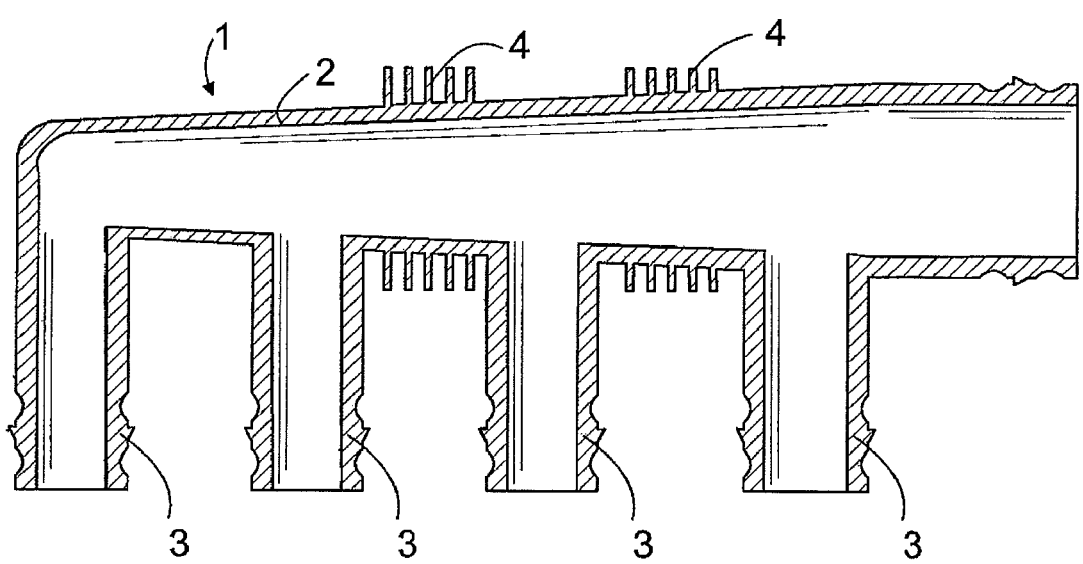
FIG. 4 is a schematic, cross-sectional side view showing a second embodiment of a manifold.

The wall of the body 2 of the manifold 1 is substantially equally thick throughout, which means that the shape of the outer surface of the body 2 thus also resembles a convergent cone and the coning angle of the outer surface is substantially equal in size to the coning angle of the inner surface. If desired, the coning angle of the outer surface can also be made larger than the coning angle of the inner surface, as shown in FIG. 4. The thickness of the body 2 of the manifold 1 is then smaller at the rear end than at the front end thereof. When the diameter of the body 2 of the manifold is at its smallest, the thickness of the wall does not have to be as large as at the largest diameter and yet the structure of the manifold can be made strong enough. An embodiment is to make the structure of the manifold 1 such that the ratio of the outer diameter of the body 2 of the manifold to the wall thickness remains substantially constant.

The inner diameter of the manifold 1 is convergent such that at the rear end, i.e. at the closing end, of the manifold 1, the inner diameter of the body 2 is equal in size to the inner diameter of the last branch fitting 3. Hence, the flow of liquid inside the manifold can be divided in an optimal manner. Also preferably, if one of the branch fittings 3 is larger than the others, this branch fitting with the larger diameter is arranged at the front end of the manifold, i.e. closest to the main pipe.

The outer surface of the body 2 of the manifold 1 is provided with ribs 4 around the body 2. The outer diameters of the ribs 4 are all substantially equal in size, i.e. at the front end of the manifold 1 the height of the ribs 4 from the outer surface of the body 2 is smaller than that at the closing end of the manifold 1. This enables the ribs 4 to be readily utilized while attaching the manifold in place. The manifold 1 can be attached in place e.g. such that at the location where the manifold is to be placed, e.g. in an installation cabinet or room, e.g. a wall has been provided with fasteners for the ribs 4. The manifold 1 can simply be pressed in place such that the ribs fasten to a fastener equipped with jaws. The ribs 4 also stiffen the structure of the body 2 such that the wall of the body 2 does not have to be very thick.

The main pipe and the branch pipes can be attached to the body 2 of the manifold and to the branch fittings 3 e.g. by push-pull coupling and/or using clamping rings. Furthermore, the connections can also be implemented by means of thread joints or in some other manner.

Figure 2:
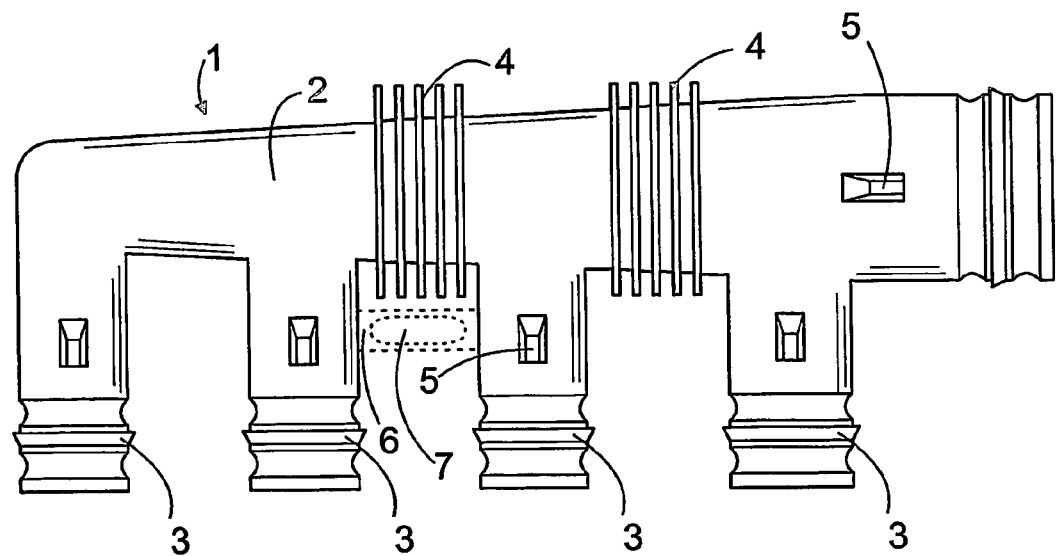
FIG. 2 is a side view showing the manifold of FIG. 1.

FIG. 2 is a side view showing the manifold 1. FIG. 2 also shows stopping projections 5. The purpose of the stopping projections 5 is to stop the main pipe to be inserted into the body of the manifold or the branch pipes to be inserted into the branch fitting 3 at their correct place.

The manifold shown in the figure is particularly advantageously suited for use in tap water systems. The manifold must then be able to resist a temperature of 95° temporarily and a temperature of 70° for a period of fifty years. The manifold 1 is manufactured from plastic by die-casting. The manifold may then be manufactured e.g. from polyphenyl sulfone PPSU, polysulphone PSU, polyvinylidene fluoride PVDF, glass fibre reinforced polyamide PA, or cross-linked polyolefin plastic, such as cross-linked polyethylen PEX. It is also possible to use other appropriate materials.

FIG. 2 also shows, by a broken line, a fastening part 6. The fixing part 6 has an opening constituting a slot 7. The manifold 1 can be fastened in place by arranging a screw or screws through the slot 7. The slot 7 enables the manifold 1 to be able to move in an axial direction, which movement in the axial direction may be caused e.g. by thermal expansion. In FIG. 2, the fastening part 6 is arranged between two branch fittings 3. If desired, the fastening part 6 may be fastened e.g. only to one of the branch fittings, or to the body of the manifold.

Figure 3:
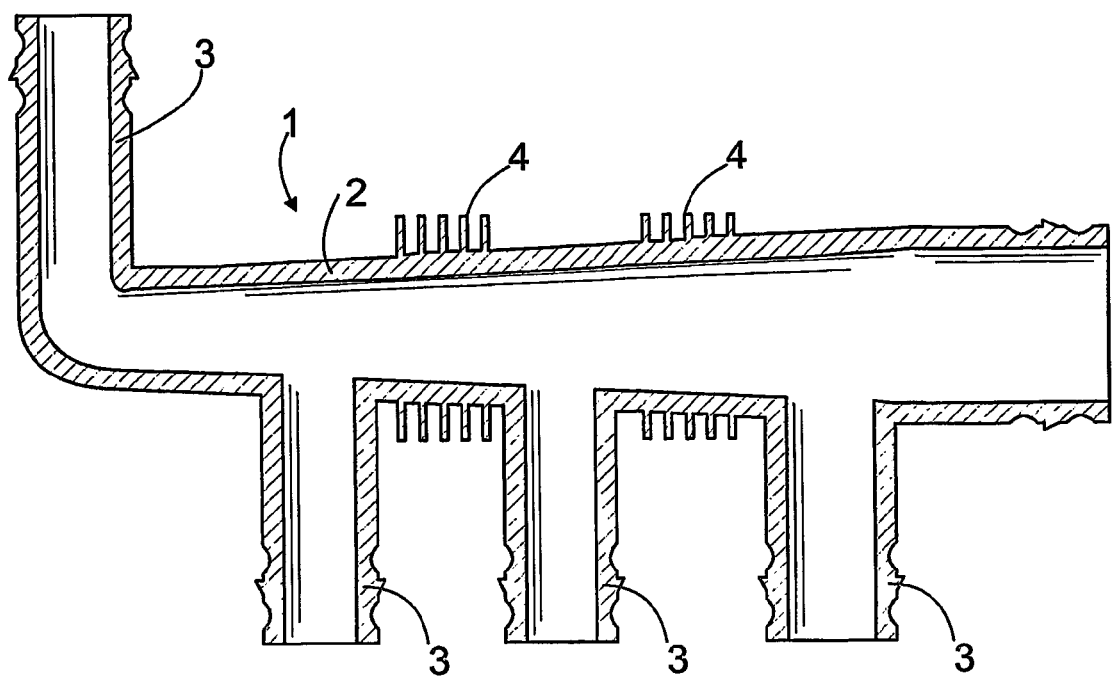
FIG. 3 is a schematic, cross-sectional side view showing another manifold.

FIG. 3 shows a manifold 1 whose last branch fitting 3 diverges from the body 2 180° in a different direction than the rest of the branch fittings 3. Such a solution sometimes enables e.g. additional bends to be prevented in the branch pipes to be connected. Furthermore, it is easier to provide connections in adjacent branch fittings since more room can be provided for installation around the branch fitting 3. If desired, the manifold can also be formed such that one or more branch fittings diverges e.g. 90° in a different direction than the rest of the branch fittings. Furthermore, other diverging directions are also possible. In FIG. 3, the rear end of the manifold 1 is further formed such that the connection of the last branch fitting to the body 2 forms a bend of rather a large curvature. The radius of curvature of the external angle of the particular bend is e.g. 6-60 mm when the inner diameter of the branch fitting is about 10 mm. The flow can then be made very smooth.

The drawing and the related description are only intended to illustrate the idea of the invention. In its details, the invention may vary within the scope of the claims. Thus, the coning angle of the inner surface of the manifold 1 does not necessarily continuously have to be equal in size. The manifold can be formed e.g. such that the coning angle of the inner surface is larger at the front end than at the rear end thereof. On the other hand, the coning angles can be formed to change such that at the front end of the manifold the coning angle is smaller while at the rear end of the manifold the coning angle is larger. Furthermore, the coning angle may change more often than once along the manifold. Other ways of change in the coning angle of the manifold are also possible and a portion of the manifold may also be straight, i.e. its coning angle at the particular point is then about 0°. The coning angle of the outer surface may also change in a similar manner.

The invention claimed is:

1. A manifold comprising a body with a plurality of branch fittings diverging therefrom, wherein the inner surface of the body is conical such that the inner cross-sectional area of the body decreases in the direction of flow, and
    the manifold comprises ribs around the body, the ribs having outer diameters equal in size irrespective of the inner diameter of the body.

2. A manifold as claimed in claim 1, wherein the outer surface of the body is also conical.

3. A manifold as claimed in claim 2, wherein the coning angle of the inner surface of the body of the manifold is substantially equal in size to the coning angle of the outer surface of the body of the manifold, whereby a wall of the body is thoroughly substantially equally thick.

4. A manifold as claimed in claim 2, wherein the coning angle of the outer surface of the body of the manifold is larger than the coning angle of the inner surface of the body of the manifold, whereby the wall of the body is thinner at the rear part of the manifold than at the front part thereof.

5. A manifold as claimed in claim 4, wherein the ratio of the outer diameter of the body of the manifold to the thickness of the wall of the body remains substantially equal in size along the body of the manifold.

6. A manifold as claimed in claim 1, wherein the coning angle of the inner surface of the body is at least 2°.

7. A manifold as claimed in claim 1, wherein the outer surface of the manifold is provided with ribs for fastening the manifold.

8. A manifold as claimed in claim 1, wherein the inner diameter of the body of the manifold at the rear end of the manifold is substantially equal in size to the inner diameter of the last branch fitting.

9. A manifold as claimed in claim 1, wherein the body is closed at its rear end.

10. A manifold as claimed in claim 1, wherein the manifold comprises a fastening part equipped with a slot for fastening the manifold 11. A manifold as claimed in claim 1, wherein the manifold is a manifold of a tap water system.

12. A manifold as claimed in claim 1, wherein the manifold is manufactured from polyphenyl sulfone PPSU, polysulphone PSU, polyvinylidene fluoride PVDF, or glass fibre reinforced polyamide PA, or cross-linked polyolefin plastic.

13. A manifold comprising a body with a plurality of branch fittings diverging therefrom, wherein
   the inner surface of the body is conical such that the inner cross-sectional area of the body decreases in the direction of flow,
   the outer surface of the body is also conical, and
   the coning angle of the outer surface of the body of the manifold is larger than the coning angle of the inner surface of the body of the manifold, whereby the wall of the body is thinner at the rear part of the manifold than at the front part thereof.

14. A manifold comprising a body with a plurality of branch fittings diverging therefrom, wherein
   the inner surface of the body is conical such that the inner cross-sectional area of the body decreases in the direction of flow,
   the outer surface of the body is also conical
   the coning angle of the outer surface of the body of the manifold is larger than the coning angle of the inner surface of the body of the manifold, whereby the wall of the body is thinner at the rear part of the manifold than at the front part thereof, and
   the ratio of the outer diameter of the body of the manifold to the thickness of the wall of the body remains substantially equal in size along the body of the manifold.

* * * * *